(Model.)
3 Sheets—Sheet 1.
E. C. BANKWITZ.
WEIGHING SCALE.
No. 331,020.  Patented Nov. 24, 1885.
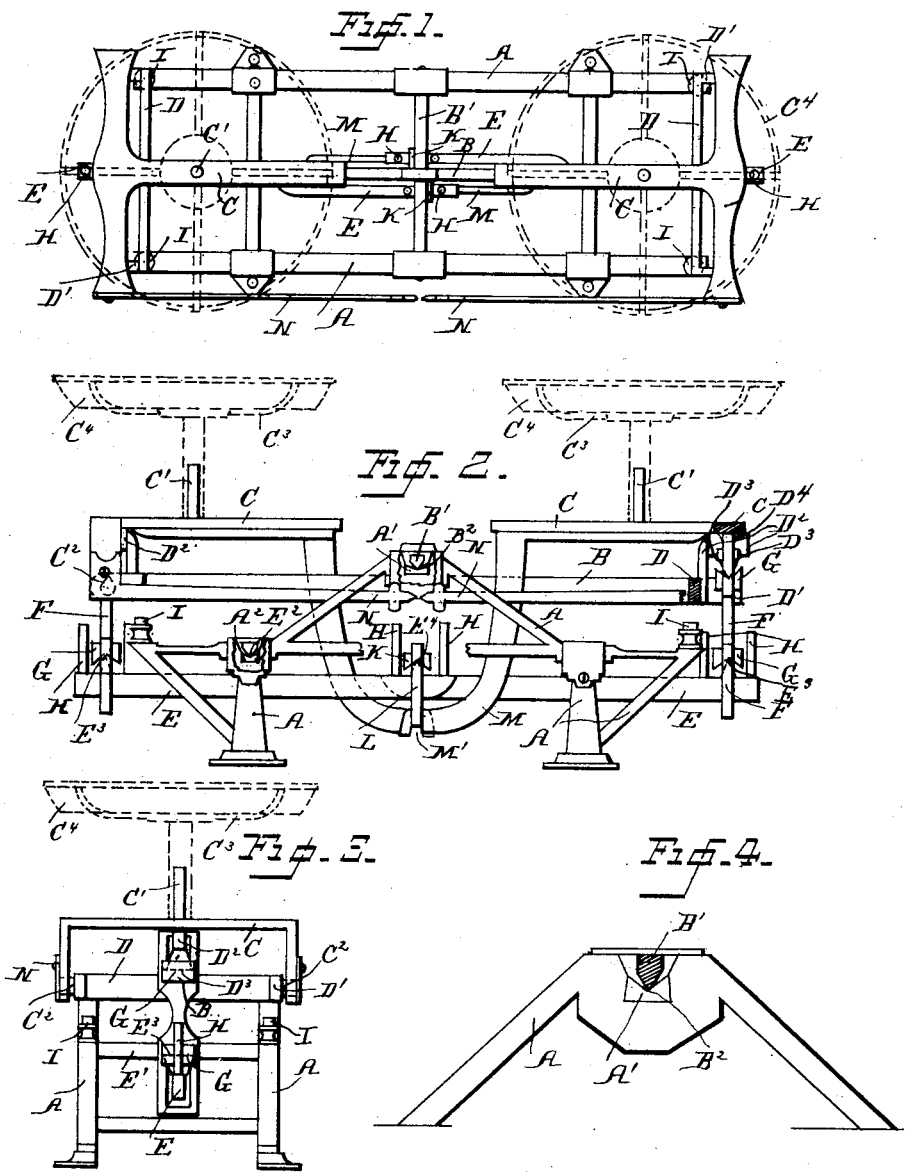
Witnesses
Wm H Jones
J T Wooster
Inventor
Ernest C. Bankwitz
By A M Wooster
atty.
N. PETERS. Photo-Lithographer, Washington, D. C.

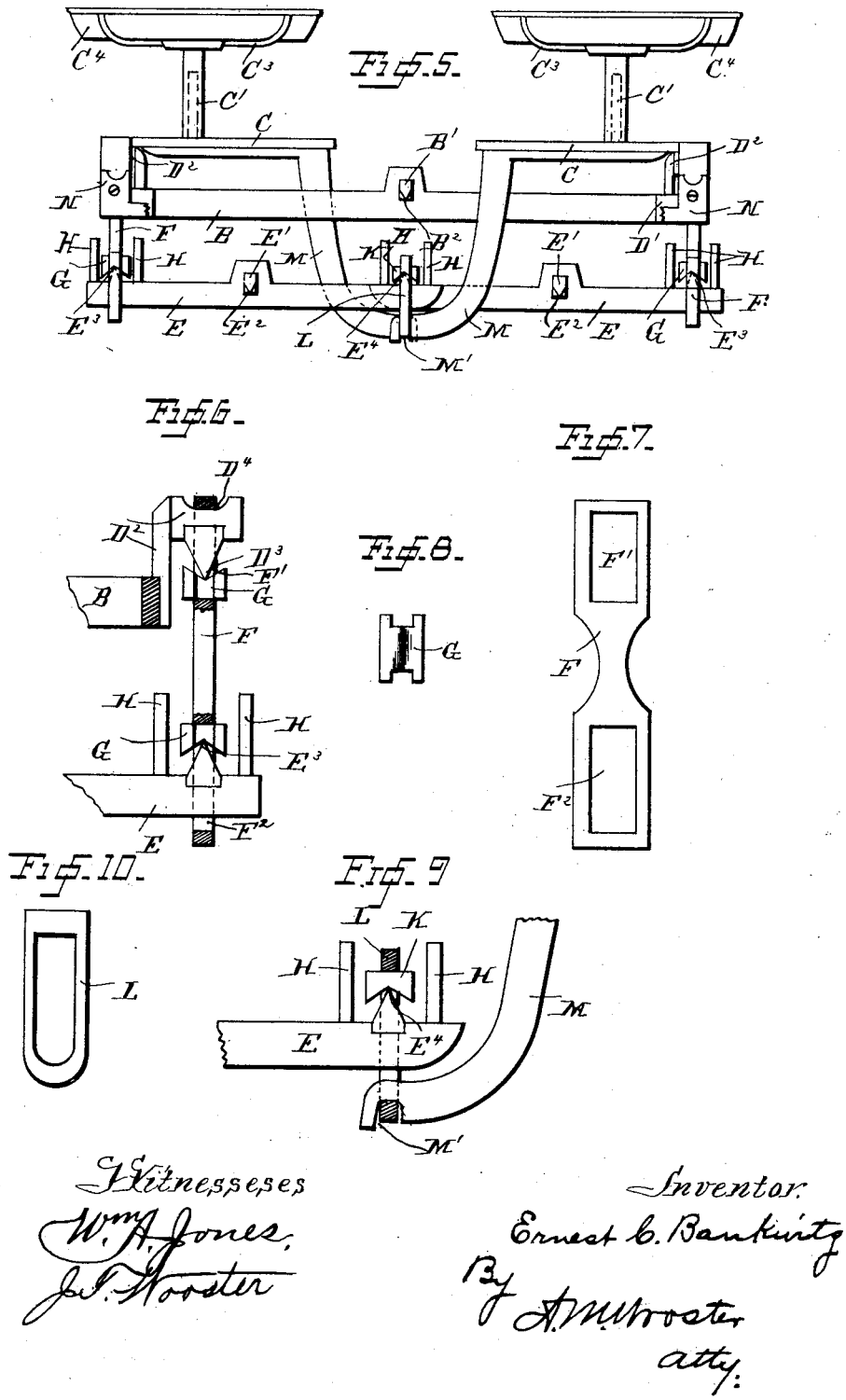

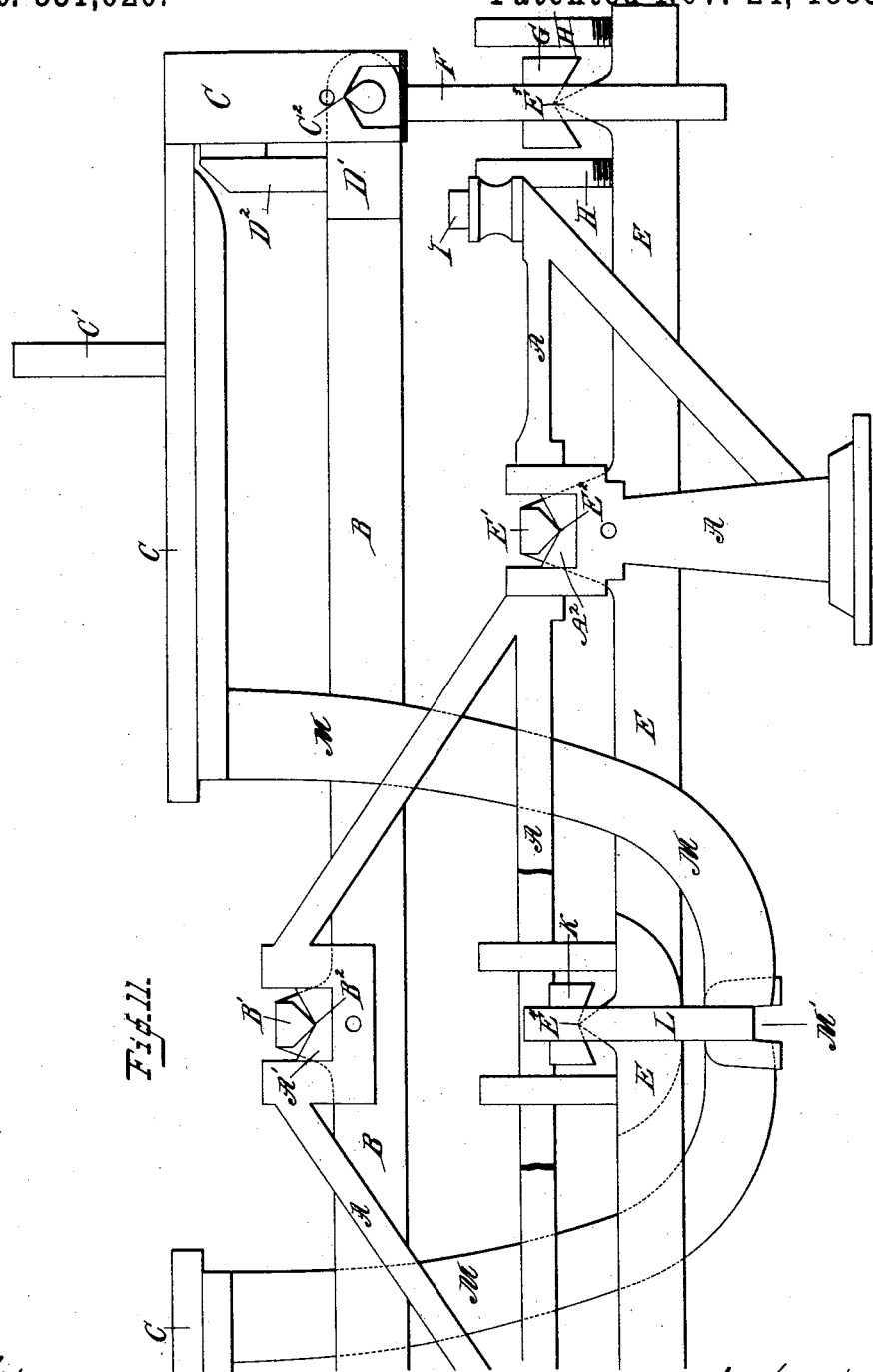

UNITED STATES PATENT OFFICE.

ERNEST C. BANKWITZ, OF BRIDGEPORT, CONNECTICUT.

WEIGHING-SCALE.

SPECIFICATION forming part of Letters Patent No. 331,020, dated November 24, 1885.

Application filed February 14, 1885. Serial No. 155,877. (Model.)

*To all whom it may concern:*

Be it known that I, ERNEST C. BANKWITZ, a citizen of the United States, residing at Bridgeport, in the county of Fairfield and State of Connecticut, have invented certain new and useful Improvements in Scales; and I do hereby declare the following to be a full, clear, and exact description of the invention, such as will enable others skilled in the art to which it appertains to make and use the same.

My invention has for its object to produce a scale which shall be simple in construction, economical in cost, durable, and always ready for use, and which at the same time shall be so extremely sensitive that an ordinary jeweler's or druggist's twenty-pound counter-scale will turn upon a fraction of a grain. With this end in view I have devised the simple and novel construction which I will now describe, referring by letters to the accompanying drawings, forming part of this specification, in which—

Figure 1 is a plan view; Fig. 2, a side elevation with parts broken away; Fig. 3, an end view; Fig. 4, an enlarged view of one of the bearings; Fig. 5, a side view of the weighing mechanism with the frame-work removed; Fig. 6, a side view, on an enlarged scale, of the end of the beam and secondary beam, with the connecting-link in section; Fig. 7, a view of the link detached; Fig. 8, a view of one of the bearings detached; Fig. 9, a side view, on an enlarged scale, of the end of one of the secondary beams and curved arms, with the connecting-link in section; Fig. 10, a view of the link detached; and Fig. 11 is a side elevation, full size, of all but one end of the scale, the frame being slightly broken away at the center, and the pointers, caps over the bearings, pans, &c., being removed.

The same letters indicate the same or like parts in all the figures.

A indicates the frame-work, which may be of any suitable construction.

B is the beam, having a central cross-piece, B', provided with knife-edges $B^2$ at each end, which rest in bearings A' in the frame-work.

C C indicate the jacks, which are provided with posts C', which carry the rests $C^3$ for the pans $C^4$. The jacks are supported upon knife-edges $C^2$, which are carried by arms D' upon cross-bars D at the ends of the beams.

E E indicate secondary beams, (one being placed at each end of the scale,) which are supported upon knife-edges $E^2$ at the ends of central cross-bars, E', which rest in bearings $A^2$ in the frame-work. At the outer end of each secondary beam is an upwardly-projecting knife-edge, $E^3$, and at each end of the scale-beam proper, midway between the arms D', is an arm, $D^2$, which projects upward, then outward, and is provided with a downwardly-projecting knife-edge, $D^3$.

F F indicate links, having near their ends slots F' $F^2$. These links connect the outer ends of the scale-beam proper with the outer ends of the secondary beam at each end of the scale.

G indicates detachable bearings, which are placed one at the lower end of slot F', the other at the upper end of slot $F^2$, and are engaged, respectively, by the knife-edges $D^3$ and $E^3$. The upper end of this link rests in a notch, $D^4$, in the arm $D^2$ of the beam, and the lower end, with its bearing, is prevented from slipping out of place by screw-pins H in the secondary beam. (See Fig. 11.)

I indicates posts at the corners of the frame-work, against which the cross-bars D strike to limit the downward movement of the beam. At the inner ends of the secondary beams are upwardly-projecting knife-edges $E^4$.

K indicates detachable bearings which rest upon these knife-edges, and are held in position by pins H, similar to those at the other ends of the secondary beams, and by depending links or loops L, which are loosely engaged by curved arms M, which depend from the inner ends of the jacks, each arm being provided its end with a notch, M', in which the loop rests. (See Figs. 9 and 11.) N N represent pointers which are secured to the jacks, and project inward, their points nearly touching each other. The perfect balancing of the scales, or the perfect equality in weight of the contents of the two pans, is indicated when the two points register.

The great advantages of my improved scale are the extreme simplicity and cheapness of its construction for a scale of this class, its durability, and non-liability to get out of repair, and its extreme sensitiveness to the slightest weight in one of the pans. The parts are all strongly made, and are interchangeable. The ends of the beams and levers, the contact portions of the links, and the knife-edges and bearings are all case-hardened, so that the bearing-surfaces throughout the scale are hard as glass. As stated above, the bearings are removable, and the knife-edges may be readily slipped out and new ones substituted, should it at any time become desirable to do so. The extreme sensitiveness of the scale is wholly owing to my improved construction. It will be observed that the moving parts of the scale turn upon sixteen knife-edges, as follows: two at the ends of the cross-bar of the beam, two at the ends of the beam, four which support the jacks, four at the ends of the cross-bars of the secondary beams, and four at the ends of the secondary beams. By this construction the greatest sensitiveness is secured which is possible in a strong and serviceable counter-scale having a capacity of twenty or more pounds. This scale is perfectly adapted for general counter uses, but will be found especially adapted for use as a druggist's or goldsmith's scale, for the reasons that fractions of a grain or fractions of a pound are equally within its capacity.

Having thus described my invention, I claim—

1. In a scale, the beam, and a jack supported at each end of the beam and having depending arms, in combination with secondary beams at opposite ends of the scale, a link connecting each end of the beam with the outer end of a secondary beam, and a link connecting the end of each depending arm with the inner end of a secondary beam.

2. The beam, secondary beams, and jacks, the latter being provided with depending arms, and all being supported on knife-edges, in combination with links which connect each end of the beam with the outer end of a secondary beam, and other links which connect an arm depending from each jack with the inner end of a secondary beam.

3. The beam, secondary beams, and jacks, all supported on knife-edges, and knife-edges at the ends of the beam and secondary beams, in combination with links which connect the ends of the beam with the outer ends of the secondary beams, and other links which connect the inner ends of the secondary beams with arms depending from the jacks, said links being provided with bearings for the knife-edges.

4. The beam and secondary beams having cross-pieces provided with knife-edges, and bearings therefor in the frame-work, in combination with the jacks supported on knife-edges carried by arms at the ends of the beam, and having depending arms and links which connect the outer ends of the secondary beams with the beam, and other links which connect the inner ends thereof with the depending arms.

5. The beam, secondary beams, and jacks, having depending arms, in combination with links which connect the ends of the beam with the outer ends of the secondary beams, and other links which connect the inner ends of the secondary beams with the depending arms.

6. The beam and secondary beams having knife-edges at their ends, and the jacks having depending arms, in combination with links which connect the ends of the beam with the outer ends of the secondary beams, and other links which connect the inner ends of the secondary beams with the depending arms, said links being provided with bearings for the knife-edges.

7. The beam, secondary beams, jacks having depending arms, and the knife-edges, in combination with links which connect the ends of the secondary beams with the beam, and other links which connect the depending arms with the secondary beams, and detachable bearings carried by the links which engage the knife-edges.

8. The beam having at each end a cross-bar provided with knife-edges $C^2$, and a central arm, $D^2$, in combination with the jacks carried by knife-edges $C^2$, the secondary beams, and links F, which connect the secondary beams with arms $D^2$.

9. In a scale, the beam and secondary beams each supported on knife-edges, and having a knife-edge at each end, in combination with the jacks, also supported on knife-edges, and links F and L, substantially as described.

10. The jacks carrying pointers N, and having pins $C'$ for the attachment of the pans, in combination with the beam, secondary beams, and links, as described, and for the purpose set forth.

11. The beam having a downwardly-projecting knife-edge at each end, and the secondary beams having upwardly-projecting knife-edges at their outer ends, in combination with links F, having slots at their ends and adapted to carry detachable bearings which engage the knife-edges.

12. The secondary beams having knife-edges at their inner ends, and the jacks having downwardly-projecting arms with notches $M'$, in combination with links L, carrying detachable bearings which engage the knife-edges, and pins H, which hold the parts from displacement.

In testimony whereof I affix my signature in presence of two witnesses.

ERNEST C. BANKWITZ.

Witnesses:
A. M. WOOSTER,
WM. A. JONES.